(12) United States Patent
Kitahara

(10) Patent No.: US 6,865,885 B2
(45) Date of Patent: Mar. 15, 2005

(54) EXHAUST GAS PURIFYING METHOD AND APPARATUS FOR INTERNAL COMBUSTION ENGINE

(75) Inventor: Yasuhisa Kitahara, Yokohama (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/375,154

(22) Filed: Feb. 28, 2003

(65) Prior Publication Data

US 2003/0182936 A1 Oct. 2, 2003

(30) Foreign Application Priority Data

Mar. 29, 2002 (JP) ...................................... 2002-095884

(51) Int. Cl.$^7$ ................................................ F01N 3/00
(52) U.S. Cl. .......................... 60/297; 60/274; 60/276; 60/285; 60/295; 60/311
(58) Field of Search ..................... 60/274, 276, 285, 60/295, 297, 311, 278, 280

(56) References Cited

U.S. PATENT DOCUMENTS

| | | | |
|---|---|---|---|
| 5,050,376 A | | 9/1991 | Stiglic et al. |
| 5,746,989 A | * | 5/1998 | Murachi et al. ......... 423/213.7 |
| 5,974,791 A | * | 11/1999 | Hirota et al. .................. 60/276 |
| 6,490,857 B2 | * | 12/2002 | Sasaki ........................... 60/278 |
| 6,588,204 B2 | * | 7/2003 | Hirota et al. .................. 60/297 |
| 6,644,022 B2 | * | 11/2003 | Hirota et al. .................. 60/297 |

FOREIGN PATENT DOCUMENTS

| | | |
|---|---|---|
| JP | 2000-161044 A | 6/2000 |
| WO | WO 02/086301 A1 | 10/2002 |

OTHER PUBLICATIONS

Patent Abstract of Japan; vol. 006, No. 106, May 10, 1983, JP 58–028580, Feb. 19, 1983.

* cited by examiner

*Primary Examiner*—Binh Q. Tran
(74) *Attorney, Agent, or Firm*—Foley & Lardner LLP

(57) ABSTRACT

An exhaust gas purifying method for an internal combustion engine, including determining an amount of particulates in an exhaust gas which is accumulated in a particulate filter disposed within an exhaust passage of the engine, determining whether the particulate filter is at an adequate state for regeneration, and executing regeneration of the particulate filter by controlling oxygen concentration in the exhaust gas depending on the amount of the trapped particulates when it is determined that the particulate filter is at the adequate state and the amount of the accumulated particulates exceeds a first preset value. An exhaust gas purifying apparatus corresponding to the method.

32 Claims, 7 Drawing Sheets

TARGET INTAKE AIR AMOUNT FOR
CONTROLLING EXCESS AIR RATIO
TO SET VALUE UPON REGENERATION

AUXILIARY FUEL INJECTION AMOUNT
REQUIRED FOR REGENERATION

EXHAUST GAS PURIFYING METHOD AND APPARATUS FOR INTERNAL COMBUSTION ENGINE

BACKGROUND OF THE INVENTION

The present invention relates to an exhaust gas purifying method and apparatus for an internal combustion engine, and more specifically to a method and apparatus for regenerating a particulate filter for trapping particulates present in exhaust gas.

An exhaust gas purifying apparatus having a diesel particulate filter (hereinafter referred to as DPF) is known. The DPF is adapted to trap particulates (hereinafter referred to as PM) present in exhaust gas emitted from an internal combustion engine, particularly, a diesel engine. When an amount of the PM trapped and accumulated in the DPF increases, the exhaust pressure upstream of the DPF increases to cause deterioration in the performance of the engine. Therefore, the DPF must be periodically regenerated by removing the PM accumulated therein.

Japanese Patent Application First Publication No. 2000-161044 discloses a method of regenerating a DPF. In this related art, the DPF is regenerated when an internal combustion engine is operated within a preset regeneration range. Even when the operation of the engine is out of the regeneration range, the DPF is continuously regenerated if the temperature of the DPF is a preset value or more. The related art aims for suppression of increase in fuel consumption required to raise the temperature of the DPF upon regeneration, by continuing the regeneration of the DPF even if the engine operating condition is out of the regeneration range.

SUMMARY OF THE INVENTION

The above-described related art has the following problems because the amount of the PM accumulated in the DPF is not taken into consideration. In the related art, when the operating condition of the engine is out of the regeneration range, the regeneration of the DPF is inhibited until the engine operating condition comes into the regeneration range even if the amount of the PM accumulated in the DPF is large. This causes remarkable increase in the amount of the PM accumulated in the DPF. If the engine operating condition is in the regeneration range when the amount of the PM accumulated remarkably increases, the PM accumulated will be rapidly burnt by so-called propagation-combustion to thereby produce an excessive quantity of heat. A temperature of the inside of the DPF will extremely increase due to the excessive quantity of heat. As a result, the DPF will be significantly deteriorated in efficiency of trapping the PM after the regeneration.

It would therefore be desirable to provide an exhaust gas purifying method and apparatus capable of reducing thermal load exerted on the DPF to thereby improve durability of the DPF, and of effectively performing regeneration of the DPF.

In one aspect of the present invention, there is provided a method for purifying exhaust gas passing through a particulate filter disposed in an exhaust passage in an internal combustion engine, the method comprising:

determining an amount of particulates in the exhaust gas which is trapped and accumulated in the particulate filter;

determining whether the particulate filter is at an adequate state for regeneration; and executing regeneration of the particulate filter by controlling oxygen concentration in the exhaust gas depending on the amount of the trapped particulates when it is determined that the particulate filter is at the adequate state and the amount of the accumulated particulates exceeds a first preset value.

In a further aspect of the present invention, there is provided an apparatus for purifying exhaust gas in an exhaust passage in an internal combustion engine, the apparatus comprising:

a plurality of sensors detecting parameters relative to an engine operating condition;

a particulate filter operative to trap and accumulate particulates present in exhaust gas flowing thereinto, the particulate filter being disposed in the exhaust passage; and a controller programmed to determine an amount of the particulates accumulated by the particulate filter using the parameters detected by the sensors, to determine whether the particulate filter is at an adequate state for regeneration, and to execute regeneration of the particulate filter by controlling oxygen concentration in the exhaust gas depending on the amount of the accumulated particulates when it is determined that the particulate filter is at the adequate state and the amount of the accumulated particulates exceeds a first preset value.

In a still further aspect of the present invention, there is provided an article of manufacture comprising:

a computer storage medium having a computer executable program code, the code for purifying exhaust gas passing through a particulate filter disposed in an exhaust passage in an internal combustion engine, the code comprising:

code to determine an amount of the particulates present in the exhaust gas which is trapped by the particulate filter;

code to determine whether the particulate filter is at an adequate state for regeneration; and code to execute regeneration of the particulate filter by controlling oxygen concentration in the exhaust gas depending on the amount of the accumulated particulates when it is determined that the particulate filter is at the adequate state and the amount of the accumulated particulates exceeds a first preset value.

DETAILED DESCRIPTION OF THE PREFERRED EMBODIMENT

Figure 1:
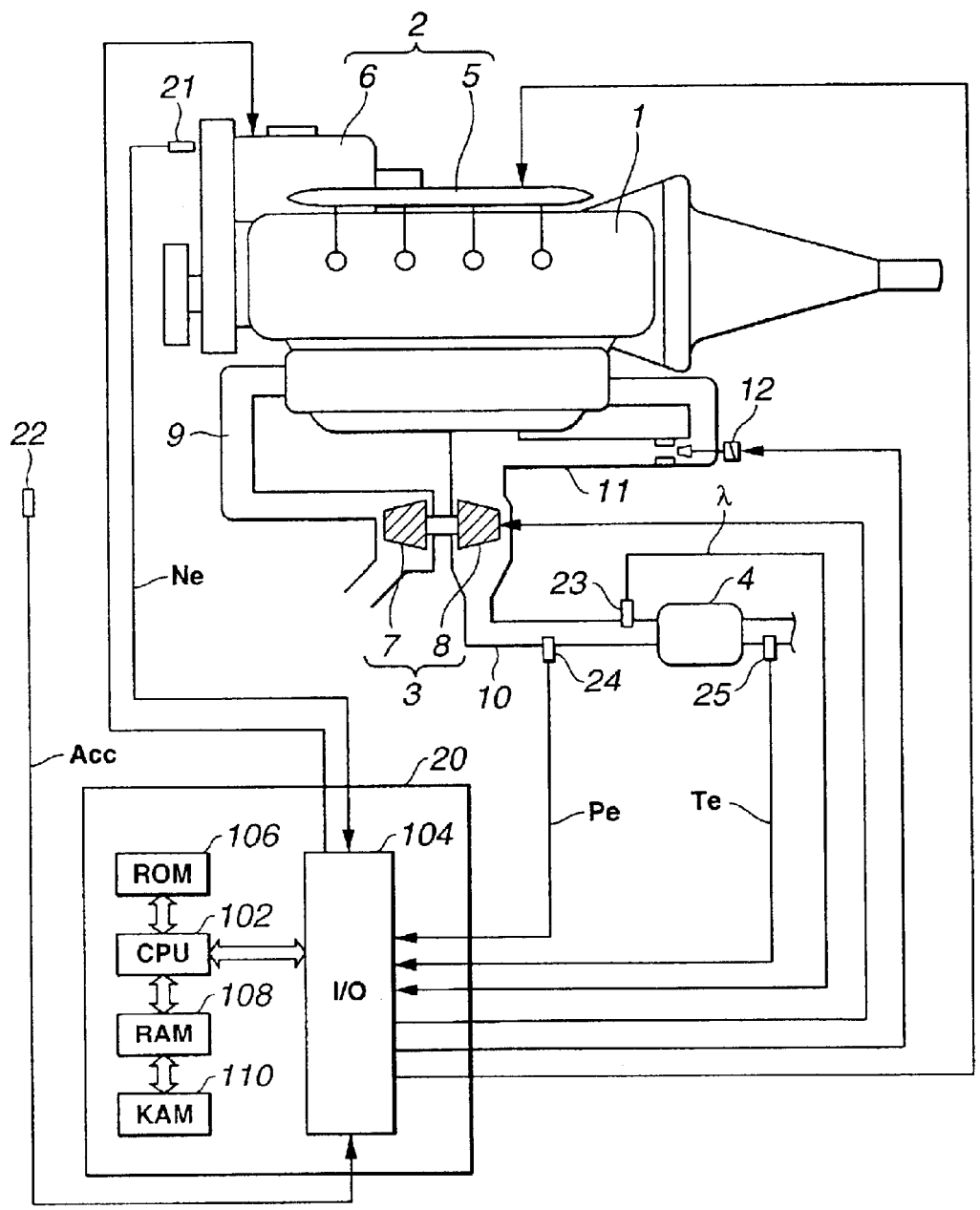
FIG. 1 is a schematic diagram illustrating a diesel engine into which an exhaust gas purifying apparatus according to an embodiment of the present invention is applicable.

Referring now to FIGS. 1–10, an exhaust gas purification method and apparatus of an embodiment of the invention is explained. The exhaust gas purification method and apparatus is applicable to a supercharged diesel engine. As illustrated in FIG. 1, the supercharged diesel engine includes diesel engine body 1, common-rail fuel injection system 2, supercharger 3, diesel particulate filter (DPF) 4 and controller 20.

Fuel injection system 2 is mounted to engine body 1 and includes common rail 5 and fuel pump 6. High pressure fuel is supplied to engine body 1 by fuel injection system 2. Supercharger 3 includes compressor 7 and turbine 8 which are disposed within intake passage 9 of engine body 1 and exhaust passage 10 thereof, respectively. Turbine 8 is rotated by the exhaust gas from engine body 1, thereby driving compressor 7 to compress intake air. The compressed intake air is supplied to engine body 1 via intake passage 9. Supercharger 3 is a so-called variable nozzle turbocharger with a variable nozzle having a variable opening to adjust a cross-sectional area of the nozzle which allows the exhaust gas to flow through turbine 8. DPF 4 carries noble metals thereon and has an oxidation ability oxidizing an exhaust component flowing into DPF 4. DPF 4 purifies the exhaust gas by the oxidation ability and also traps and accumulates particulates (PM) present in the exhaust gas.

Exhaust gas recirculation (EGR) passage 11 is branched from exhaust passage 10 between engine body 1 and turbine 8 of supercharger 3 and connected to an intake system of the engine. EGR valve 12 that is variable in the opening degree is disposed within EGR passage 11. When EGR valve 12 is in a closed state, an entire amount of the exhaust gas from engine body 1 is allowed to pass through turbine 8 and then to be purified by DPF 4 and discharged therefrom. On the other hand, when EGR valve 12 is in an open state, a part of the exhaust gas from engine body 1 is recirculated to the intake system via EGR passage 11.

A plurality of sensors are connected to controller 20. The sensors includes engine speed sensor 21, accelerator sensor 22, excess air ratio sensor 23, pressure sensor 24 and exhaust temperature sensor 25. Engine speed sensor 21 detects engine speed, i.e., the number of engine revolution, and generates signal Ne indicative of the detected engine speed. Accelerator sensor 22 detects an opening degree of an accelerator and generates signal Acc indicative of the detected accelerator opening degree. Excess air ratio sensor 23 is disposed upstream of DPF 4 and detects an excess air ratio of the exhaust gas and generates signal $\lambda$ indicative of the detected excess air ratio. Pressure sensor 24 is disposed upstream of DPF 4 and detects a pressure of the exhaust gas and generates signal Pe indicative of the detected exhaust gas pressure. Exhaust temperature sensor 25 is disposed downstream of DPF 4 and detects a temperature of the exhaust gas which is substantially the same as a temperature of DPF 4, and generates signal Te indicative of the detected exhaust gas temperature, i.e., the DPF temperature. Controller 20 receives the signals generated from the sensors and processes the signals to determine an engine operating condition. Depending on the engine operating condition, controller 20 performs various controls including controls of main fuel injection, auxiliary fuel injection for the DPF regeneration, an opening degree of EGR valve 12, and an A/R ratio of supercharger 3. The A/R ratio is a ratio of a smallest cross-sectional area of the variable nozzle of supercharger 3 to a distance between a center axis of turbine 7 and a center of the smallest cross-sectional area. Controller 20 shown in FIG. 1 is a microcomputer including a central processing unit (CPU) 102, input and output ports (I/O) 104, an electronic storage medium for executable programs and calibration values, shown as read-only memory (ROM) 106, random access memory (RAM) 108, keep alive memory (KAM) 110, and a common data bus.

Figure 2:
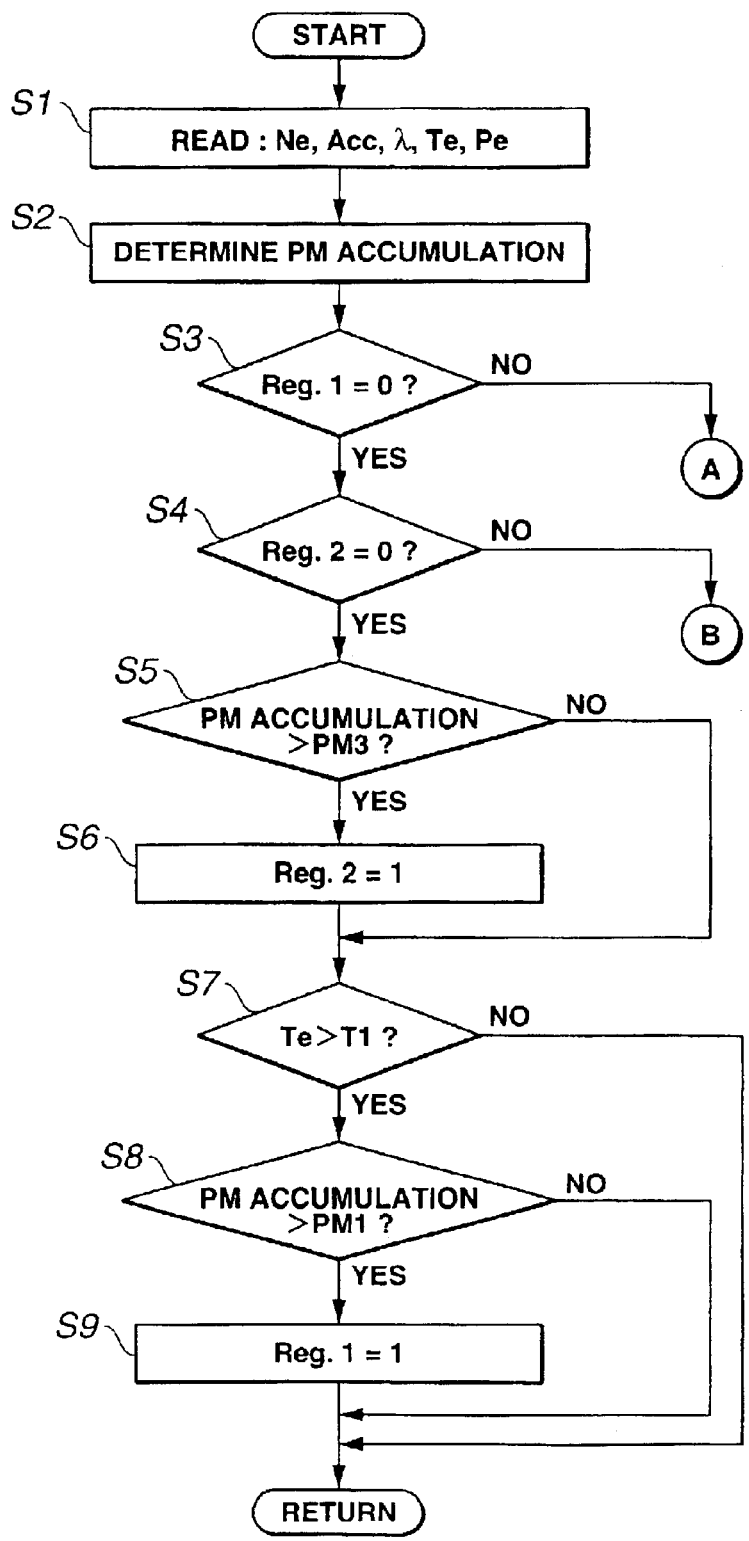
FIG. 2 is a flowchart of a routine executed for a DPF regeneration control in the embodiment.

Next, referring to FIG. 2, a flow of the DPF regeneration control implemented by controller 20 is explained. Logic flow starts and goes to block S1 where engine speed signal Ne, accelerator opening degree signal Acc, excess air ratio signal $\lambda$, exhaust gas pressure signal Pe, and exhaust gas temperature (DPF temperature) signal Te are read. An engine operating condition is determined based on these parameters. Fuel injection amount Q is also calculated by searching a map preset based on engine speed signal Ne and accelerator opening degree signal Acc. The logic then goes to block S2 where an amount of PM trapped and accumulated in DPF 4 (PM accumulation amount) is determined. Specifically, in this embodiment, the PM accumulation amount is predicted by monitoring exhaust gas pressure Pe. This is because exhaust gas pressure Pe increases as the PM accumulation amount increases. This prediction may be conducted by calculating difference $\Delta P$ between exhaust gas pressure Pe monitored and atmospheric pressure Pa, and searching PM accumulation amount map preset based on difference $\Delta P$. Determination of the PM accumulation amount is not limited to the above-described prediction but it may be performed by other prediction methods based on, for instance, a vehicle traveling distance from the previous execution of DPF regeneration, and combination of accumulated engine speed Ne and exhaust gas pressure Pe. Further, determination of the PM accumulation amount may be performed by directly detecting the PM accumulation amount.

At block S3, an interrogation is made whether or not a normal regeneration flag (Reg. 1) is "0 (zero)". If, at block S3, the interrogation is in negative (Reg. 1=1), the logic goes to a routine of normal regeneration of DPF 4 as explained later by referring to FIG. 3. If, at block S3, the interrogation is in affirmative (Reg. 1=0), the logic goes to block S4. At block S4, an interrogation is made whether or not an emergency regeneration flag (Reg. 2) is "0 (zero)". If, at block S4, the interrogation is in negative (Reg. 2=1), the logic goes to a routine of emergency regeneration of DPF 4 as explained later by referring to FIG. 4. If, at block S4, the interrogation is in affirmative (Reg. 2=0), the logic goes to block S5. At block S5, an interrogation is made whether or not the PM accumulation amount exceeds preset value PM3. Preset value PM3 is larger than a value at which drivability of the engine is undesirably influenced by exhaust gas pressure Pe upstream of DPF 4. If the PM accumulation amount is more than preset value PM3, the emergency regeneration of DPF 4 must be conducted. In contrast, if DPF 4 is subjected to simple regeneration when the PM accumulation amount is more than preset value PM3, the PM accumulated in DPF 4 will be rapidly burnt due to diffusion combustion. This causes excessive temperature rise of DPF 4, so that the temperature of DPF 4 will increase more than an allowable upper limit.

If, at block S5, the interrogation is in affirmative, indicating that the PM accumulation amount is more than preset value PM3, the logic goes to block S6 where the emergency regeneration flag (Reg. 2) is set at "1" (Reg. 2=1). If, at block S5, the interrogation is in negative, indicating that the PM accumulation amount is not more than preset value PM3, the logic jumps to block S7. Therefore, the emergency regeneration of DPF 4 is conducted regardless of whether or not an adequate state for DPF regeneration is determined.

At block S7, it is determined whether or not DPF 4 is at the adequate state for the normal regeneration (hereinafter referred to as adequate regeneration state). Namely, at block S7, an interrogation is made whether or not exhaust gas temperature Te (DPF temperature) is larger than preset value T1. Preset value T1 is a temperature at which the oxidization ability of DPF 4 is activated to oxidize a liquid-phase component (heavy hydrocarbon component) present in the exhaust gas. Specifically, in this embodiment, the DPF regeneration is conducted by providing auxiliary fuel injection after combustion of the fuel injected upon main fuel injection is completed. By conducting the auxiliary fuel injection, fuel as an oxidant is supplied into the exhaust gas. Then, the temperature of DPF 4 rises because of the oxidization ability, namely, due to heat of reaction of the catalyst carried on DPF 4, so that the PM accumulated in DPF 4 are burnt and DPF 4 is regenerated.

Figure 5:
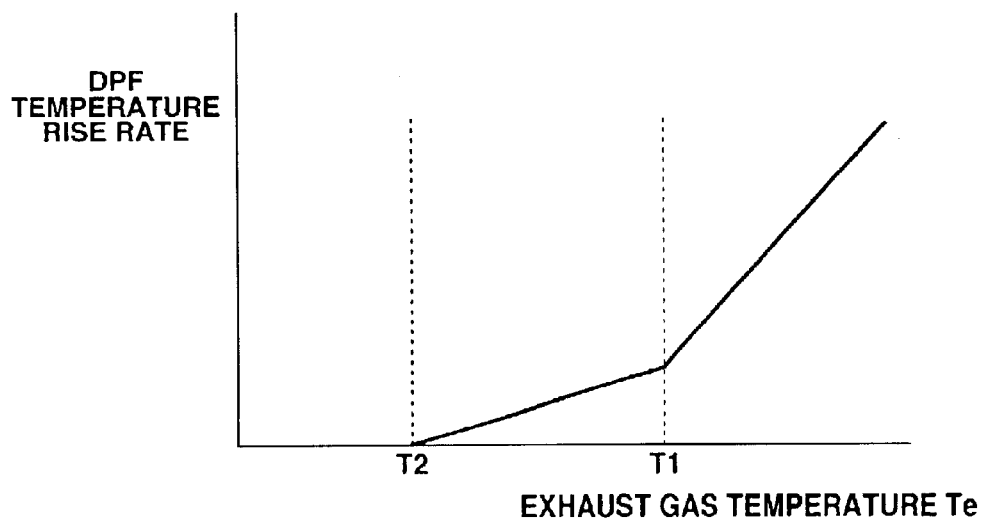
FIG. 5 is a diagram illustrating a relationship between exhaust temperature and DPF temperature rise rate.

Referring now to FIG. 5, there is shown a relationship between temperature rise rate of DPF 4 and exhaust gas temperature Te. In FIG. 5, temperature T2 represents catalyst activation temperature at which the oxidization ability of DPF 4 is activated to oxidize or purify the fuel present as a vapor-phase component in the exhaust gas. If liquid-phase fuel is present in the exhaust gas even when exhaust gas temperature Te exceeds catalyst activation temperature T2, the temperature rise rate of DPF 4 will decrease, and therefore, time required for regenerating DPF 4 will increase. In contrast, if exhaust gas temperature Te exceeds preset temperature T1, the reaction of the liquid-phase component with the catalyst will be facilitated so that the temperature rise rate of DPF 4 can rapidly increase.

Accordingly, if the regeneration of DPF 4 is quickly performed even when both the vapor-phase fuel and the liquid-phase fuel are present in the exhaust gas, it can be determined that DPF 4 is at the adequate regeneration state. Namely, if, at block S7, the interrogation is in affirmative, indicating that exhaust gas temperature Te is more than preset temperature T1, it is determined that DPF 4 is at the adequate regeneration state, and the logic goes to block S8. At block S8, it is determined whether or not another condition for executing the normal regeneration of DPF 4 is satisfied. If, at block S7, the interrogation is in negative, it is determined that DPF 4 is not at the adequate regeneration state and the routine is terminated. Namely, if exhaust gas temperature Te is not more than preset temperature T1, the time required for raising the temperature of DPF 4 will increase to thereby cause deterioration in fuel economy. In this case, the DPF regeneration is not executed.

Figure 6:
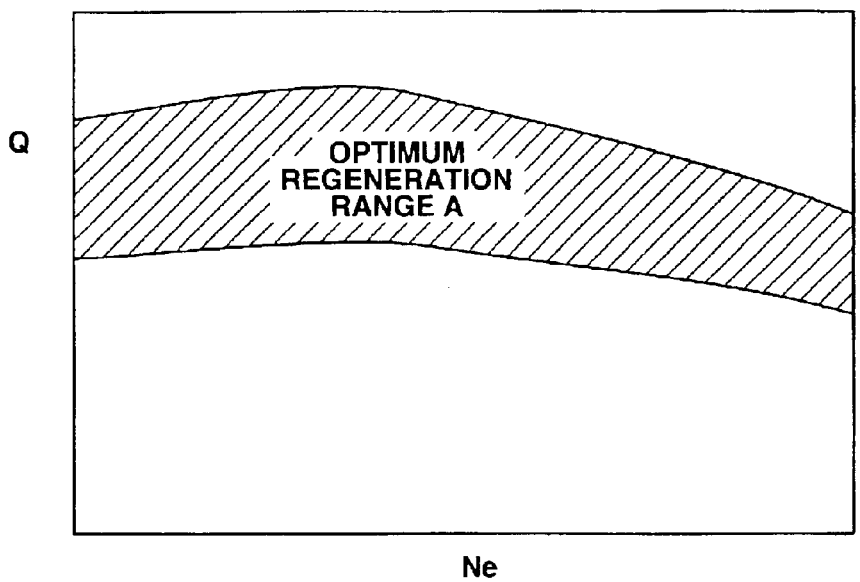
FIG. 6 is a map illustrating an optimum DPF regeneration range.

The determination of the adequate regeneration state at block S7 is not limited to using exhaust gas temperature Te as explained above, and it can be made by searching a map shown in FIG. 6, based on engine speed Ne and fuel injection amount Q. The map shows optimum regeneration range "A" of the engine operating condition, in which exhaust gas temperature Te is more than preset temperature T1. Thus, at block S7, an interrogation may be alternatively made whether or not the engine operating condition is in optimum regeneration range "A". If the interrogation is in affirmative, the logic goes to block S8. Further, in this case, if it is determined that DPF 4 is at the adequate regeneration state when the engine operation is kept in the optimum regeneration range "A" during a time period preset on the basis of thermal inertia of the exhaust system, more efficient DPF regeneration can be attained.

At block S8, an interrogation is made whether or not the PM accumulation amount is larger than preset value PM1 which is a minimum value required for the normal regeneration of DPF 4. This is because deterioration in fuel economy will occasionally occur upon executing the DPF regeneration even when it is determined that DPF 4 is at the adequate regeneration state. In addition, if the PM accumulation amount does not reach preset value PM1, the PM accumulated will not be burnt by propagation-combustion upon executing the DPF regeneration. This causes deterioration in regeneration of DPF 4. If, at block S8, the interrogation is in affirmative, the logic goes to block S9 where the normal regeneration flag (Reg. 1) is set at "1" (Reg. 1=1). If, at block S8, the interrogation is in negative, the routine is terminated. Accordingly, the normal regeneration of DPF 4 is executed under condition that DPF 4 is at the adequate regeneration state and that the PM accumulation amount is larger than preset value PM1. This serves for keeping the regeneration efficiency at a high level.

Figure 3:
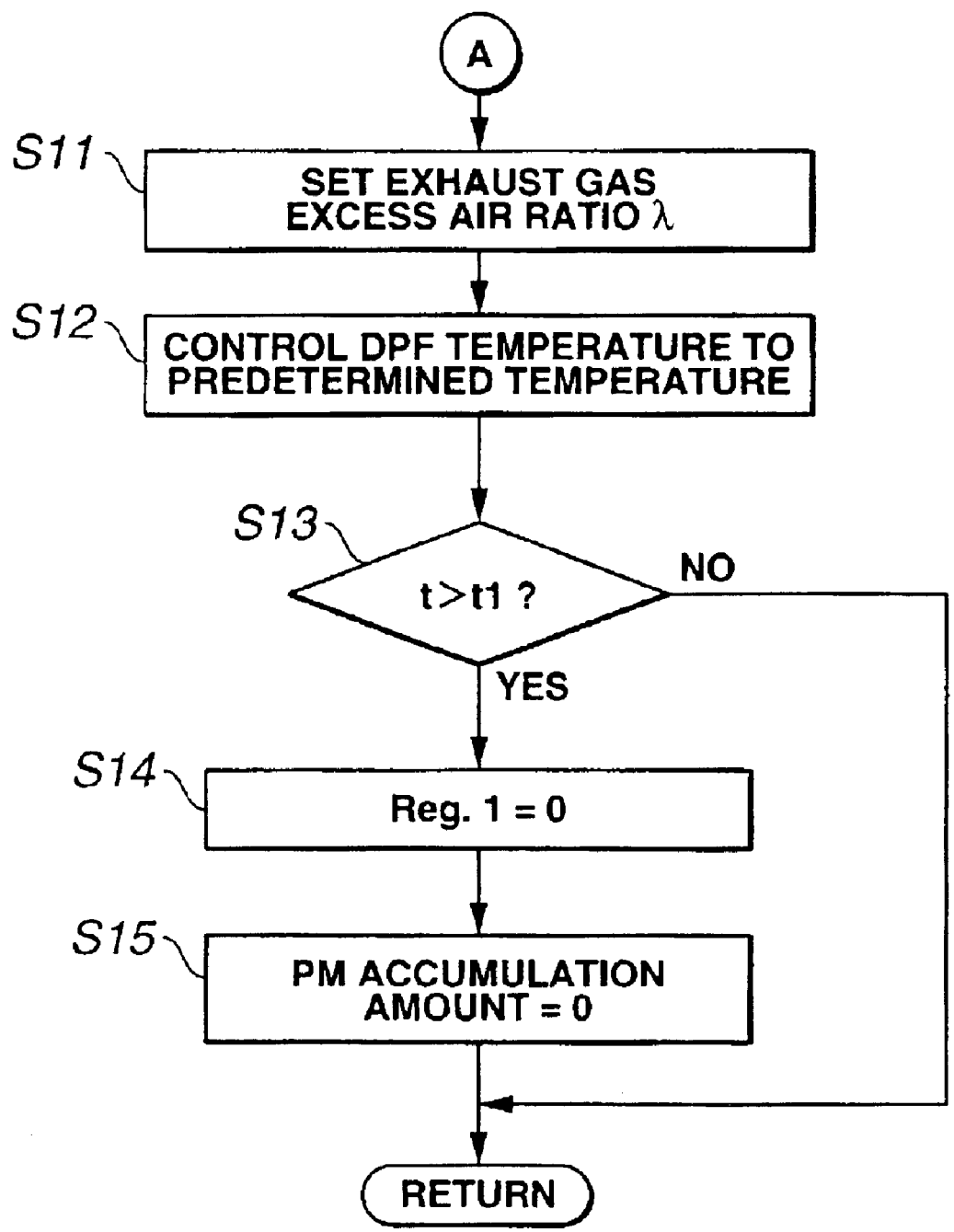
FIG. 3 is a flowchart of an operation performed upon a normal DPF regeneration.

Next, referring to FIG. 3, a flow of the normal regeneration of DPF 4 is explained. The normal regeneration routine is executed by controller 20 when the normal regeneration flag (Reg. 1) is set at "1" at block S3 of FIG. 2. Logic flow starts at block S11 of FIG. 3. At block S11, excess air ratio $\lambda$ of the exhaust gas, namely, oxygen concentration of the exhaust gas flowing into DPF 4, is set depending on the PM accumulation amount. This setting of excess air ratio $\lambda$ is conducted in order to perform the DPF regeneration as efficiently as possible and to inhibit the temperature of DPF 4 from exceeding the above-described allowable upper limit during the regeneration. This is because when exhaust gas temperature Te is larger than preset temperature T1, the DPF temperature varies depending on the PM accumulation amount and excess air ratio $\lambda$ corresponding to the PM accumulation amount.

Figure 7:
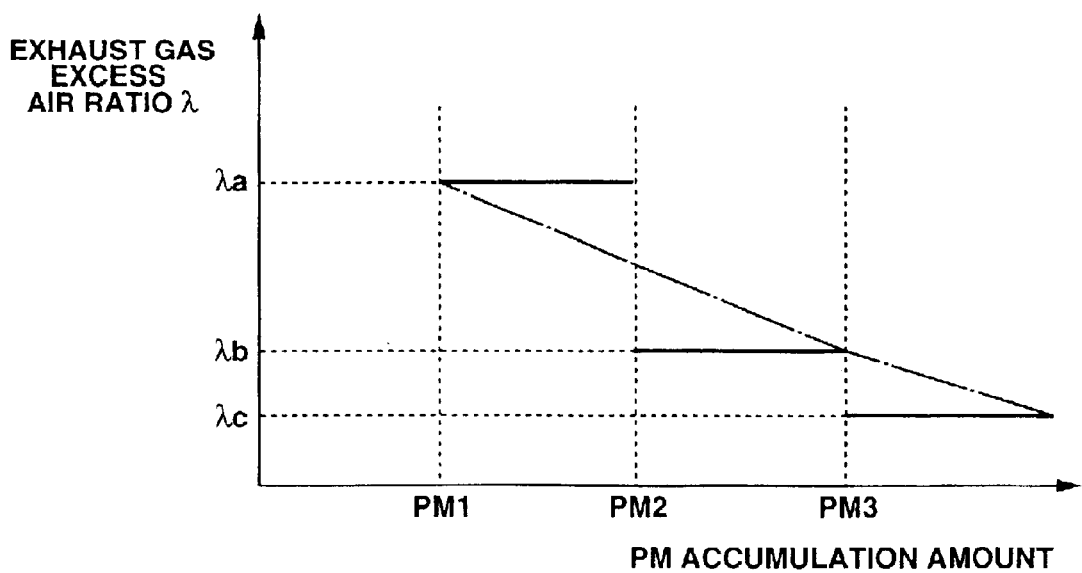
FIG. 7 is an example of a map used for setting exhaust gas excess air ratio (oxygen concentration) based on an amount of PM accumulated in the DPF.

Specifically, the setting of excess air ratio $\lambda$ is conducted by searching a map shown in FIG. 7. In the normal regeneration routine shown in FIG. 3, excess air ratio $\lambda$ is set to either a value not more than $\lambda a$ or a value not more than $\lambda b$ as shown in FIG. 7. The map of FIG. 7 is given using a relationship between the temperature of DPF 4 during the regeneration, the PM accumulation amount, and excess air ratio $\lambda$ as shown in FIG. 8.

Figure 8:
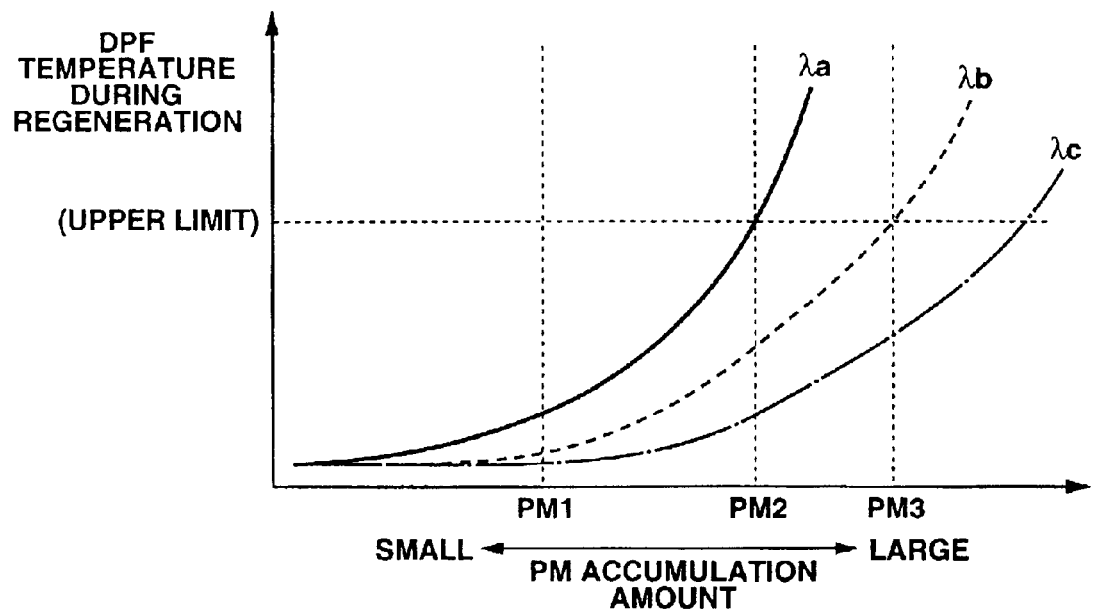
FIG. 8 is a diagram illustrating a relationship between DPF temperature during the regeneration, an amount of PM accumulated in the DPF, and exhaust gas oxygen concentration.
Figure 9:
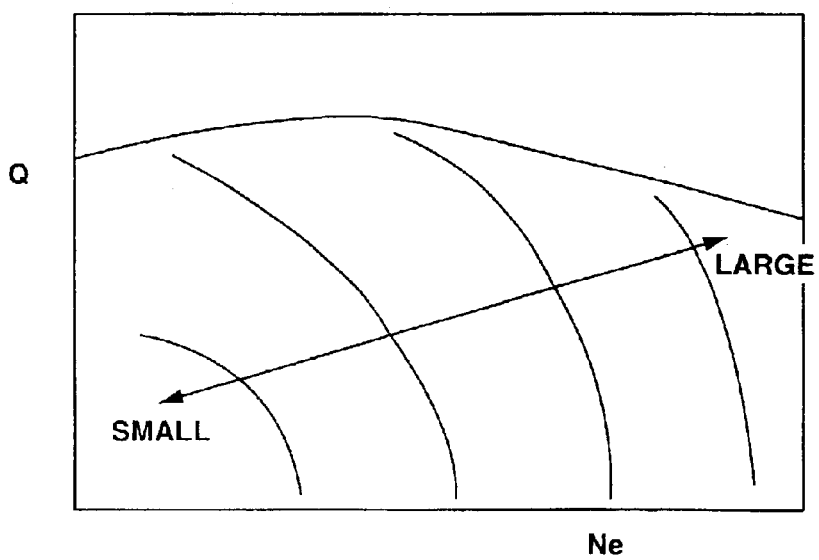
FIG. 9 is an example of a map used for setting a target intake air amount for obtaining the exhaust gas oxygen concentration set.

As illustrated in FIG. 8, preset value PM2 is disposed between minimum preset value PM1 required for the DPF regeneration and preset value PM3 undesirably influencing the drivability of the engine. Preset value PM2 is a value of the PM accumulation amount at which the drivability of the engine is not influenced undesirably but the temperature of DPF 4 exceeds the allowable upper limit. Preset value PM2 is larger than preset value PM1 and smaller than preset value PM3. When the PM accumulation amount is in a range between preset value PM1 and preset value PM2, excess air ratio $\lambda$, namely, oxygen concentration, of the exhaust gas is maximum value $\lambda a$ larger than values $\lambda b$ and $\lambda c$. At maximum value $\lambda a$, the oxygen concentration of the exhaust gas is larger than that of the exhaust gas emitted upon a normal engine operation in which the DPF regeneration is not executed. Even when excess air ratio $\lambda$ is at maximum value $\lambda a$, the temperature of DPF 4 is smaller than the allowable upper limit. Therefore, in a case where the PM accumulation amount is in the range between preset values PM1 and PM2, excess air ratio $\lambda$ is set at the value not more than $\lambda$a in order to facilitate burning of the PM accumulated. When the PM accumulation amount is in the range between preset values PM2 and PM3, excess air ratio $\lambda$ is set at the value not more than $\lambda$b smaller than $\lambda$a in order to suppress the burning rate of the PM accumulated and prevent the DPF temperature from exceeding the allowable upper limit. Further, when the PM accumulation amount is in the range more than preset value PM3, excess air ratio $\lambda$ is set at the value not more than $\lambda$c smaller than $\lambda$b.

The above-described setting of excess air ratio $\lambda$ may be performed in two manners as shown in FIG. 7. Excess air ratio $\lambda$ may be set by varying stepwise as shown in solid lines of FIG. 7. Alternatively, excess air ratio $\lambda$ may be set by continuously varying as shown in broken line of FIG. 7. In the manner of varying stepwise, if the PM accumulation amount is not more than preset value PM2, excess air ratio $\lambda$ may be set at maximum value $\lambda$a. If the PM accumulation amount is larger than preset value PM2, excess air ratio $\lambda$ may be set at value $\lambda$b. In contrast, in the manner of varying continuously, excess air ratio $\lambda$ may be set along with change in the PM accumulation amount during the DPF regeneration. In this case, as the PM accumulation amount continuously decreases during the DPF regeneration, excess air ratio $\lambda$ may be set larger. This serves for efficiently performing the DPF regeneration. Meanwhile, in this case, if the PM accumulation amount is in the range between preset values PM1 and PM2, excess air ratio $\lambda$ may be fixed at maximum value $\lambda$a.

Controlling excess air ratio $\lambda$ to set values $\lambda$a and $\lambda$b is performed by selectively controlling a target intake air amount which is set for each excess air ratio $\lambda$. The target intake air amount is selected from a map shown in FIG. 9, based on engine speed Ne and fuel injection amount Q. The target intake air amount selected is attained by controlling the variable nozzle of supercharger 3, an intake throttle valve (not shown), EGR valve 12, and the like. As a result, the temperature of DPF 4 can be prevented from exceeding the allowable upper limit during the regeneration, and the PM accumulated can be effectively burnt upon the regeneration.

Figure 10:
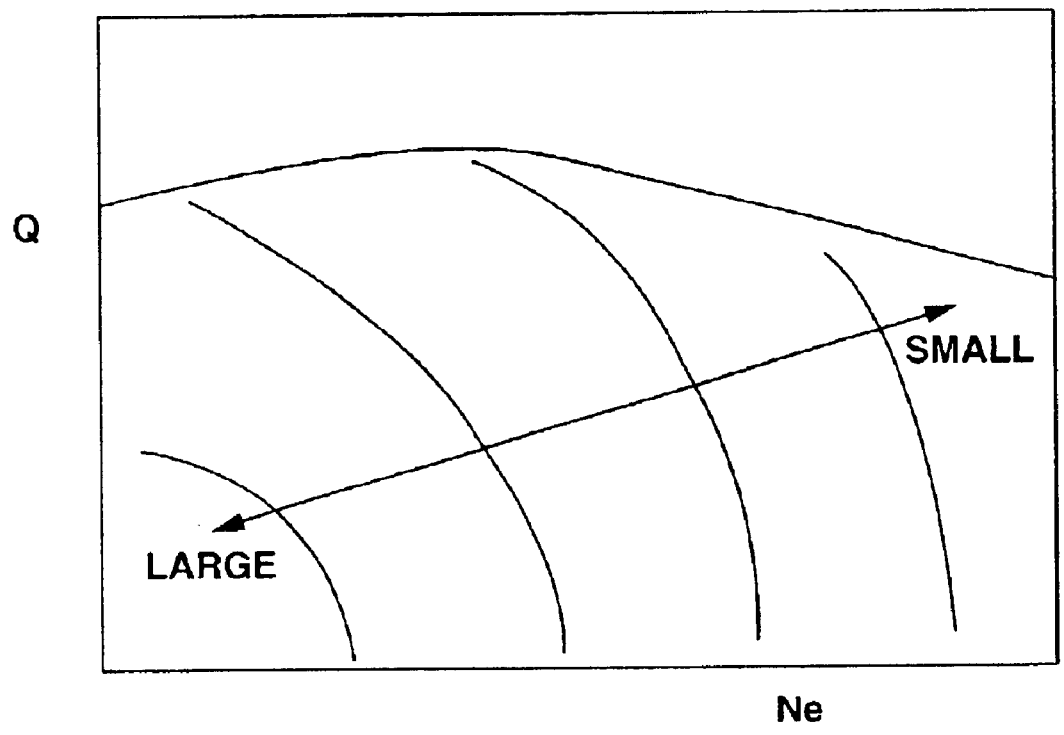
FIG. 10 is an example of a map used for setting an auxiliary fuel injection amount required for the DPF regeneration.

Referring back to FIG. 3, at block S12, the temperature of DPF 4 is controlled to a predetermined temperature, for example, 600° C., in order to conduct the DPF regeneration. Specifically, an amount of fuel for auxiliary fuel injection is injected into the exhaust gas at expansion stroke of a piston of the engine or near top dead center of exhaust stroke thereof. FIG. 10 shows the amount of fuel for auxiliary fuel injection which is set based on the engine operating condition. Owing to this auxiliary fuel injection, the temperature of DPF 4 is increased and kept at the predetermined temperature. The fuel injected upon the auxiliary fuel injection is burnt on the catalyst carried by DPF 4. Here, if exhaust gas temperature Te (the temperature of DPF 4) is not less than preset temperature T1 even when the engine operating condition is out of the optimum regeneration range, the DPF regeneration is continuously conducted.

The logic goes to block S13 where an interrogation is made whether or not time "t" elapsed after exhaust gas temperature Te reaches preset temperature T1 is more than preset time "t1". Preset time "t1" is a time period in which the normal regeneration of DPF 4 is performed. If, at block S13, the interrogation is in affirmative, indicating that preset time "t1" has elapsed, the logic goes to block S14 where the normal regeneration flag (Reg. 1) is set at "0". The logic then goes to block S15 where the PM accumulation amount is reset to "0" and the normal regeneration of DPF 4 is terminated. If, at block S13, the interrogation is in negative, the normal regeneration of DPF 4 is continuously conducted.

Figure 4:
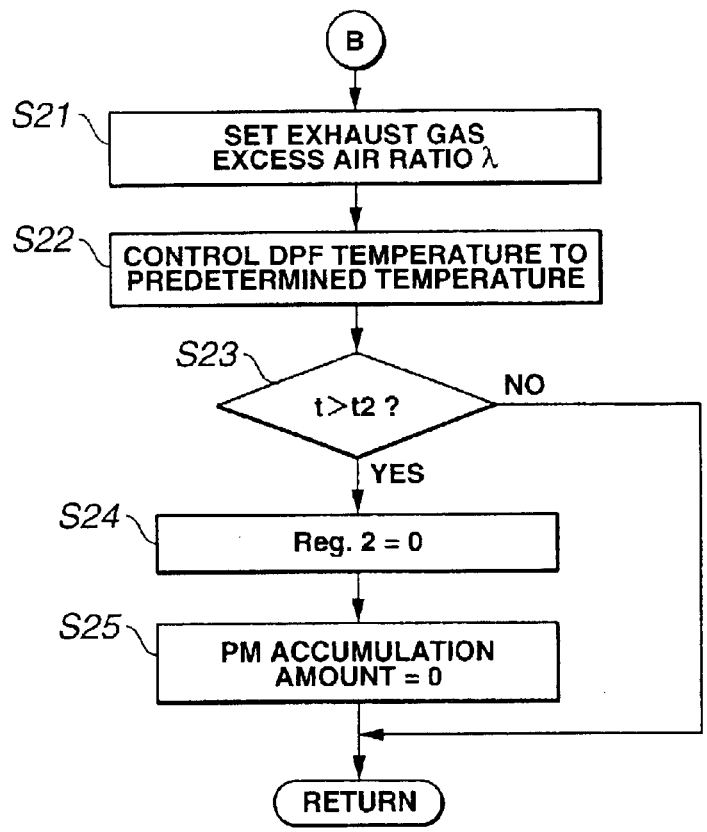
FIG. 4 is a flowchart of an operation performed upon an emergency DPF regeneration.

Next, referring to FIG. 4, a flow of the emergency regeneration of DPF 4 is explained. The emergency regeneration routine is executed by controller 20 when the emergency regeneration flag (Reg. 2) is set at "1" at block S2 of FIG. 2. Logic flow starts at block S21 of FIG. 4. At block S21, excess air ratio $\lambda$ of the exhaust gas, namely, oxygen concentration of the exhaust gas, is set at the value not more than $\lambda$c by searching the map shown in FIG. 7. The logic goes to block S22 where the temperature of DPF 4 is controlled to a predetermined temperature, for example, 600° C., in order to conduct the DPF regeneration. The logic then goes to block S23 where an interrogation is made whether or not time "t" elapsed after exhaust gas temperature Te reaches preset temperature T1 is more than preset time "t2". Preset time "t2" is a time period in which the emergency regeneration of DPF 4 is performed. If, at block S23, the interrogation is in affirmative, indicating that preset time "t2" has elapsed, the logic goes to block S24 where the emergency regeneration flag (Reg. 2 is set at "0". The logic then goes to block S25 where the PM accumulation amount is reset to "0" and the emergency regeneration of DPF 4 is terminated. If, at block S23, the interrogation is in negative, the emergency regeneration of DPF 4 is continuously conducted.

As is appreciated from the above explanation, the method and apparatus of the present invention can reduce thermal load exerted on DPF 4 to thereby improve durability of DPF 4, and can efficiently perform the DPF regeneration. Further, the method and apparatus of the invention can ensure adequate propagation-combustion of the PM accumulated in DPF 4, serving for saving the time required for the DPF regeneration. Even when the auxiliary fuel injection is conducted during the DPF regeneration, deterioration in fuel economy can be suppressed to the minimum. Further, upon the auxiliary fuel injection, heat of the reaction of the fuel injected with the catalyst carried on DPF 4 can be used to perform the efficient regeneration of DPF 4. Further, the thermal load exerted on DPF 4 can be reduced by decreasing the combustion rate of the accumulated PM during the DPF regeneration. The combustion rate of the PM accumulated can be also reduced when an amount of the PM accumulated in DPF 4 is large, and therefore, rapid burning of the PM accumulated will occur. Furthermore, the method and apparatus of the invention forcibly executes the DPF regeneration when the amount of the PM accumulated becomes larger, regardless of whether or not the engine operating condition is in the adequate regeneration range. This can prevent the deterioration in drivability of an internal combustion engine which will be caused by the PM accumulated in DPF 4.

This application is based on prior Japanese Patent Application No. 2002-095884 filed on Mar. 29, 2002, the entire content of which is hereby incorporated by reference.

Although the invention has been described above by reference to a certain embodiment of the invention, the invention is not limited to the embodiment described above. Modifications and variations of the embodiment described above will occur to those skilled in the art in light of the above teachings. The scope of the invention is defined with reference to the following claims.

What is claimed is:

1. A method for purifying exhaust gas passing through a particulate filter disposed in an exhaust passage in an internal combustion engine, the method comprising:

determining an amount of particulates in the exhaust gas which is trapped and accumulated in the particulate filter;

determining whether the particulate filter is at an adequate state for regeneration; and executing regeneration of the particulate filter by controlling oxygen concentration in the exhaust gas depending on the amount of the accumulated particulates when it is determined that the particulate filter is at the adequate state and the amount of the accumulated particulates exceeds a first preset value wherein when the amount of the trapped particulates exceeds a second preset value larger than the first preset value, the executing operation comprises reducing the oxygen concentration in the exhaust gas to a first value smaller than a second value obtained upon the regeneration being unexecuted, wherein when the amount of the accumulated particulates exceeds a third preset value larger than the second preset value, the executing operation comprises reducing the oxygen concentration in the exhaust gas to a third value smaller than a fourth value obtained when the amount of the accumulated particulates is between the second preset value and the third preset value, regardless of whether the particulate filter is at the adequate state for regeneration.

2. The method as claimed in claim 1, wherein as the amount of the accumulated particulates increases, the oxygen concentration in the exhaust gas is reduced to a smaller value.

3. The method as claimed in claim 1, wherein the executing operation comprises increasing the oxygen concentration in the exhaust gas as the amount of the accumulated particulates is reduced during execution of the regeneration.

4. The method as claimed in claim 1, wherein the particulate filter has an oxidation ability oxidizing an exhaust component flowing thereinto, the adequate state determination operation determines that the particulate filter is at the adequate state for regeneration when the oxidation ability is activated.

5. The method as claimed in claim 4, wherein the adequate state determination operation determines that the particulate filter is at the adequate state for regeneration when the oxidation ability is activated to oxidize a heavy hydrocarbon component present in the exhaust gas.

6. The method as claimed in claim 1, wherein the first preset value is a value at which an amount of the accumulated particulates is combustible when the regeneration of the particulate filter is executed.

7. The method as claimed in claim 1, wherein the second preset value is a value at which a temperature of the particulate filter exceeds an allowable upper limit when the regeneration of the particulate filter is executed at a maximum oxygen concentration in the exhaust gas flowing into the particulate filter.

8. The method as claimed in claim 1, wherein the third preset value is a value at which the engine is undesirably influenced in drivability by an exhaust gas pressure upstream of the particulate filter.

9. The method as claimed in claim 1, wherein the executing operation controls the oxygen concentration in the exhaust gas by controlling an excess air ratio.

10. The method as claimed in claim 1, wherein the particulate amount determining operation comprises predicting the amount of the accumulated particulates on the basis of an exhaust gas pressure upstream of the particulate filter.

11. An apparatus for purifying exhaust gas in an exhaust passage in an internal combustion engine, the apparatus comprising:

a plurality of sensors detecting parameters relative to an operating condition;

a particulate filter operative to trap and accumulate particulates present in exhaust gas flowing thereinto, to particulate filter being disposed in the exhaust passage; and a controller programmed to determine an amount of the particulates accumulated by the particulate filter using the parameter detected by the sensors, to determine whether the particulate filter is at an adequate state for regeneration, to execute regeneration of the particulate filter by controlling oxygen concentration in the exhaust gas depending on the amount of the accumulated particulates when it is determined that the particulate filter is at the adequate state and the amount of the accumulated particulates exceeds a first preset value, and, to reduce the oxygen concentration in the exhaust gas to a smaller value as the amount of the accumulated particulates increases.

12. An apparatus for purifying gas in an exhaust passage in an internal combustion engine, the apparatus comprising:

a plurality of sensors detecting parameters relative to an engine operating condition;

a particulate filter operative to trap and accumulate particulates present in exhaust gas flowing thereinto, the particulate filter being disposed in the exhaust passage; and a controller programmed to determine an amount of the particulates accumulated by the particulate filter using the parameters detected by the sensors, to determine whether the particulate filter is at an adequate state for regeneration, to execute regeneration of the particulate filter by controlling oxygen concentration in the exhaust gas depending on the amount of the accumulated particulates when it is determined that the particulate filter is a the adequate state and the amount of the accumulated particulates exceeds a first preset value, and, to reduce the oxygen concentration in the exhaust gas to a first value smaller than a second value obtained upon the regeneration being unexecuted, when the amount of the accumulated particulates exceeds a second preset value larger than the first preset value.

13. An apparatus for purifying exhaust gas in an exhaust passage in an internal combustion engine, the apparatus comprising:

a plurality of sensors detecting parameters relative to an engine operating condition;

a particulate filter operative to trap and accumulate particulates present in exhaust gas flowing thereinto, the particulate filter being disposed in the exhaust passage; and a controller programmed to determine an amount of the particulates accumulated by the particulate filter using the parameters detected by the sensors, to determine whether the particulate filter is at an adequate state for regeneration, and to execute regeneration of the particulate filter by controlling oxygen concentration in the exhaust gas depending on the amount of the accumulated particulates when it is determined that the particulate filter is at the adequate state and the amount of the accumulated particulates exceeds a first preset value, wherein the controller is programmed to reduce the oxygen concentration in the exhaust gas to a first value smaller than a second value obtained upon the regeneration being unexecuted when the amount of the accumulated particulates exceeds a second preset value larger than the first preset value, wherein the controller is programmed to reduce the oxygen concentration in the exhaust gas to a third value smaller than a fourth value obtained when the amount of the accumulated particulates is between the second preset value and a third preset value, regardless of whether the particulate filter is at the adequate state for regeneration, when the amount of the accumulated particulates exceeds the third preset value larger than the second preset value.

14. The apparatus as claimed in claim 13, wherein the particulate filter has an oxidation ability oxidizing an exhaust component flowing thereinto, and the controller is programmed to determine that the particulate filter is at the adequate state for regeneration when the oxidation ability is activated.

15. The apparatus as claimed in claim 14, wherein the controller is programmed to determine that the particulate filter is at the adequate state for regeneration when the oxidation ability is activated to oxidize a heavy hydrocarbon component present in the exhaust gas.

16. The apparatus as claimed in claim 13, wherein the first preset value is a value at which an amount of the accumulated particulates is combustible when the regeneration of the particulate filter is executed.

17. The apparatus as claimed in claim 13, wherein the third preset value is a value at which the engine is undesirably influenced in drivability by an exhaust gas pressure upstream of the particulate filter.

18. The apparatus as claimed in claim 13, wherein the controller is programmed to control the oxygen concentration in the exhaust gas by controlling an excess air ratio.

19. The apparatus as claimed in claim 13, wherein the controller is programmed to predict the amount of the accumulated particulates on the basis of an exhaust pressure upstream of the particulate filter.

20. The apparatus as claimed in claim 13, wherein the second preset value is a value at which a temperature of the particulate filter exceeds an allowable upper limit when the regeneration of the particulate filter is executed at a maximum oxygen concentration in the exhaust gas flowing into the particulate filter.

21. The apparatus as claimed in claim 12, wherein the second preset value is a value at which a temperature of the particulate filter exceeds an allowable upper limit when the regeneration of the particulate filter is executed at a maximum oxygen concentration in the exhaust gas flowing into the particulate filter.

22. An apparatus for purifying exhaust gas in an exhaust passage in an internal combustion engine, the apparatus comprising:

plurality of sensors detecting parameters relative to an engine operating condition;

a particulate filter operative to trap and accumulate particulates present in exhaust gas flowing thereinto, the particulate filter being disposed in the exhaust passage; and a controller programmed to determine an amount of the particulates accumulated by the particulate filter using the parameters detected by the sensors, to determine whether the particulate filter is at an adequate state for regeneration, to execute regeneration of the particulate filter by controlling oxygen concentration in the exhaust gas depending on the amount of the accumulated particulates when it is determined that the particulate filter is at the adequate state and the amount of the accumulated particulates exceeds a first present value, and to increase the oxygen concentration in the exhaust gas as the amount of the accumulated particulates is reduced during execution of the regeneration.

23. An article of manufacture comprising:

a computer storage medium having a computer executable program code, the code for purifying exhaust gas passing through a particulate filter disposed in an exhaust passage in an internal combustion engine, the code comprising:

code to determine an amount of the particulates present in the exhaust gas which is trapped and accumulated by the particulate filter;

code to determine whether the particulate filter is at an adequate state for regeneration; and code to execute regeneration of the particulate filter by controlling oxygen concentration in the exhaust gas depending on the amount of the accumulated particulates when it is determined that the particulate filter is at the adequate state and the amount of the accumulated particulates exceeds a first preset value wherein when the amount of the accumulated particulates exceeds a second preset value larger than the first preset value, the code to execute regeneration reduces the oxygen concentration in the exhaust gas to a first value smaller than a second value obtained upon the regeneration being unexecuted, wherein when the amount of the accumulated particulates exceeds a third preset value larger than the second preset value, the code to execute regeneration reduces the oxygen concentration in the exhaust gas to a third value smaller than a fourth value obtained when the amount of the accumulated particulates is between the second preset value and the third preset value, regardless of whether the particulate filter is at the adequate state for regeneration.

24. The article as claimed in claim 23, wherein the code to execute regeneration reduces the oxygen concentration in the exhaust as to a smaller value as the amount of the accumulated particulates increases.

25. The article as claimed in claim 23, wherein the code to execute regeneration increases the oxygen concentration in the exhaust gas as the amount of the accumulated particulates is reduced during execution of the regeneration.

26. The article as claimed in claim 23, wherein the particulate filter has an oxidation ability oxidizing an exhaust component flowing thereinto, the code to determine the adequate state determines that the particulate filter is at the adequate state for regeneration when the oxidation ability is activated.

27. The article as claimed in claim 26, wherein the code to determine the adequate state determines that the particulate filter is at the adequate state for regeneration when the oxidation ability is activated to oxidize a heavy hydrocarbon component present in the exhaust gas.

28. The article as claimed in claim 23, wherein the first preset value is a value at which an amount of the accumulated particulates is combustible when the regeneration of the particulate filter is executed.

29. The article as claimed in claim 23, wherein the second preset value is a value at which a temperature of the particulate filter exceeds an allowable upper limit when the regeneration of the particulate filter is executed at a maximum oxygen concentration in the exhaust gas flowing into the particulate filter.

30. The article as claimed in claim 23, wherein the third preset value is a value at which the engine is undesirably influenced in drivability by an exhaust gas pressure upstream of the particulate filter.

31. The article as claimed in claim 23, wherein the code to execute regeneration controls the oxygen concentration in the exhaust gas by controlling an excess air ratio.

32. The article as claimed in claim 23, wherein the code to determine the amount of the accumulated particulates predicts the amount of the accumulated particulates on the basis of an exhaust pressure upstream of the particulate filter.

* * * * *